United States Patent
Elsom et al.

(10) Patent No.: US 9,980,504 B2
(45) Date of Patent: May 29, 2018

(54) INNER DOOR SYSTEM FOR SOFT SERVE MACHINE

(71) Applicant: H.C. Duke & Son, LLC, East Moline, IL (US)

(72) Inventors: Kyle B. Elsom, Le Claire, IA (US); Greg Smart, Bettendorf, IA (US); James A. Quandt, East Moline, IL (US)

(73) Assignee: H.C. Duke & Son, LLC, East Moline, IL (US)

( * ) Notice: Subject to any disclaimer, the term of this patent is extended or adjusted under 35 U.S.C. 154(b) by 0 days. days.

(21) Appl. No.: 15/382,892

(22) Filed: Dec. 19, 2016

(65) Prior Publication Data

US 2017/0172175 A1 Jun. 22, 2017

Related U.S. Application Data

(60) Provisional application No. 62/269,191, filed on Dec. 18, 2015.

(51) Int. Cl.
| | |
|---|---|
| *B67D 1/08* | (2006.01) |
| *B67D 7/80* | (2010.01) |
| *A23G 9/30* | (2006.01) |
| *A23G 9/22* | (2006.01) |

(52) U.S. Cl.
CPC ............. *A23G 9/30* (2013.01); *A23G 9/225* (2013.01)

(58) Field of Classification Search
CPC .................................. A23G 9/30; A23G 9/225
See application file for complete search history.

(56) References Cited

U.S. PATENT DOCUMENTS

| | | | | |
|---|---|---|---|---|
| 5,048,724 A | * | 9/1991 | Thomas | A23G 3/28 222/105 |
| 5,405,054 A | * | 4/1995 | Thomas | A23G 3/28 222/105 |
| 6,560,973 B2 | * | 5/2003 | Jones | A23G 9/225 62/371 |
| 6,990,391 B1 | * | 1/2006 | Cunha | A23G 9/045 222/52 |
| 9,127,881 B2 | * | 9/2015 | Anderson | A23G 9/045 |
| 2004/0079761 A1 | * | 4/2004 | Chirnomas | A23G 9/225 221/92 |
| 2015/0034668 A1 | * | 2/2015 | Minard | A23G 9/281 222/1 |

* cited by examiner

*Primary Examiner* — Vishal Pancholi
(74) *Attorney, Agent, or Firm* — Dinsmore & Shohl LLP

(57) ABSTRACT

A soft serve dispensing machine includes a refrigerator cabinet. A door is hinged to the refrigerator cabinet. A freezer compartment is defined in the refrigerator cabinet and receives a soft serve product mix. Product pumps are linked with the soft serve product mix for moving the product to a dispensing portion of the soft serve dispensing machine. The product pumps are positioned proximate the front portion of the refrigerator cabinet and above the freezer compartment. A removable inner door panel is moveable between stored and deployed positions. In the deployed position, the door is in an open position and the inner door panel is attached to the refrigerator cabinet and defines a seal relative to the refrigerator cabinet and cold air within the freezer compartment is maintained in the freezer compartment while the product pumps are accessed.

20 Claims, 3 Drawing Sheets

INNER DOOR SYSTEM FOR SOFT SERVE MACHINE

CROSS-REFERENCE TO RELATED APPLICATIONS

This application claims priority of U.S. Provisional Application No. 62/269,191 filed Dec. 18, 2015 the contents of which are incorporated herein by reference.

FIELD OF THE INVENTION

The invention relates to door systems for a soft serve machine.

BACKGROUND OF THE INVENTION

Soft serve dispensing and storage machines are required to be cleaned and sanitized at specified intervals according to various regulations. Additionally regulations require that a soft serve mix or product be maintained at a specified temperature.

Typically in such cleaning operations the product pumps must be accessed and sanitizer fluid loaded into the pumps which are pumped through the mix lines and freezer cylinders and various other components of the machine may be cleaned as well. The operation typically requires that the cabinet door remain open for a lengthy period of time. In such a typical situation, the cleaning cycle would require that the product mix in the freezer compartment be relocated to an alternate cooler source to maintain the product's temperature during the cleaning cycle. Such an operation is time consuming and labor intensive. There is therefore a need in the art for a soft serve machine that will allow a cleaning operation while maintaining the product mix in the freezer portion of the machine.

SUMMARY OF THE INVENTION

In one aspect there is disclosed a soft serve dispensing machine including a refrigerator cabinet having spaced front and rear portions joined by side walls. A door is hinged to the refrigerator cabinet and is moveable between open and closed positions. A freezer compartment is defined in the refrigerator cabinet and receives a soft serve product mix. Product pumps are linked with the soft serve product mix for moving the product to a dispensing portion of the soft serve dispensing machine. The product pumps are positioned proximate the front portion of the refrigerator cabinet and above the freezer compartment. Attachment structures are positioned on the side walls of the refrigerator cabinet. A removable inner door panel is moveable between stored and deployed positions. In the deployed position, the door is in the open position and the inner door panel engages the attachment structures. The inner door panel defines a seal relative to the refrigerator cabinet and cold air within the freezer compartment is maintained in the freezer compartment.

In another aspect there is disclosed a soft serve dispensing machine including a refrigerator cabinet. A door is hinged to the refrigerator cabinet. A freezer compartment is defined in the refrigerator cabinet and receives a soft serve product mix. Product pumps are linked with the soft serve product mix for moving the product to a dispensing portion of the soft serve dispensing machine. The product pumps are positioned proximate the front portion of the refrigerator cabinet and above the freezer compartment. A removable inner door panel is moveable between stored and deployed positions. In the deployed position, the door is in an open position and the inner door panel is attached to the refrigerator cabinet and defines a seal relative to the refrigerator cabinet and cold air within the freezer compartment is maintained in the freezer compartment while the product pumps are accessed.

In a further aspect there is disclosed a method of cleaning a soft serve machine comprising the steps of: providing a refrigeration cabinet having a door hinged thereon, the refrigeration cabinet including a freezer compartment having product mix stored therein; opening the door; removing an inner door panel attached to the door and positioning the inner door panel in an attachment structure attached to the refrigeration cabinet defining a seal; accessing product pumps; performing a cleaning cycle when the product mix is maintained in the freezer compartment.

DETAILED DESCRIPTION OF THE PREFERRED EMBODIMENTS

Figure 1:
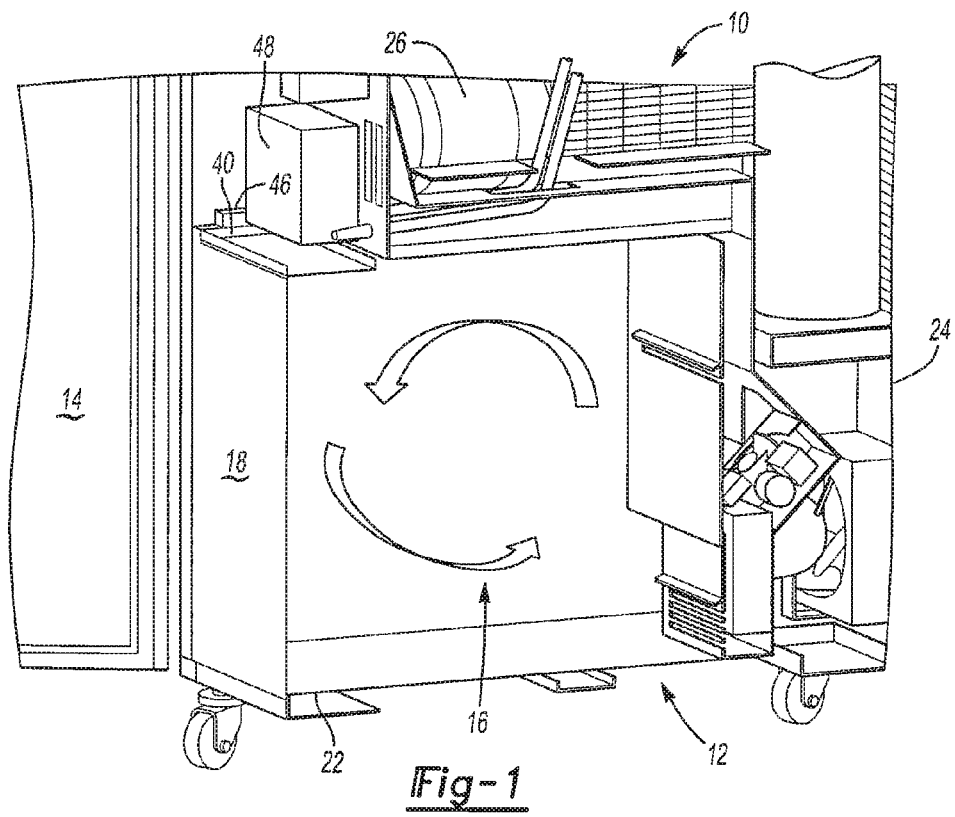
FIG. 1 is a partial cutaway perspective view of the inner door system deployed.

Referring to the figures, there is shown an inner door system 10 for a soft serve machine. The inner door system 10 includes a refrigerator cabinet 12 and door 14. The refrigerator cabinet 12 includes a freezer compartment 16 into which mix is stored and kept at a specified temperature such as below 41° Fahrenheit. Also included in the inner door system 10 is an inner door panel 18 that is removable and may be moved between stored and deployed positions.

In one aspect, the refrigerator cabinet 12 includes a door 14 that seals to maintain a cold temperature within the freezer compartment 16. The door 14 may be opened and closed to service the refrigerator cabinet 12 and replace mix as necessary. The freezer compartment 16 includes a product storage area 20 that is spaced between a front 22 and rear 24 of the cabinet 12. The product pumps 26 may be positioned forward or proximate the front 22 of the cabinet 12 and above the product storage area 20 to allow access to the pumps 26 during a cleaning cycle as will be discussed in more detail below.

The inner door panel 18 includes a main panel 28 and a top panel 30 that is hinged to the main panel 28. The top panel 30 includes a tray portion 33 defined therein. The tray portion may include a base surface 35 joined with an extending peripheral wall 37. Seals or gaskets 32 may be positioned on the top and main panels 30, 28 to interface with the freezer compartment 16, as will be discussed in more detail below.

Figure 2:
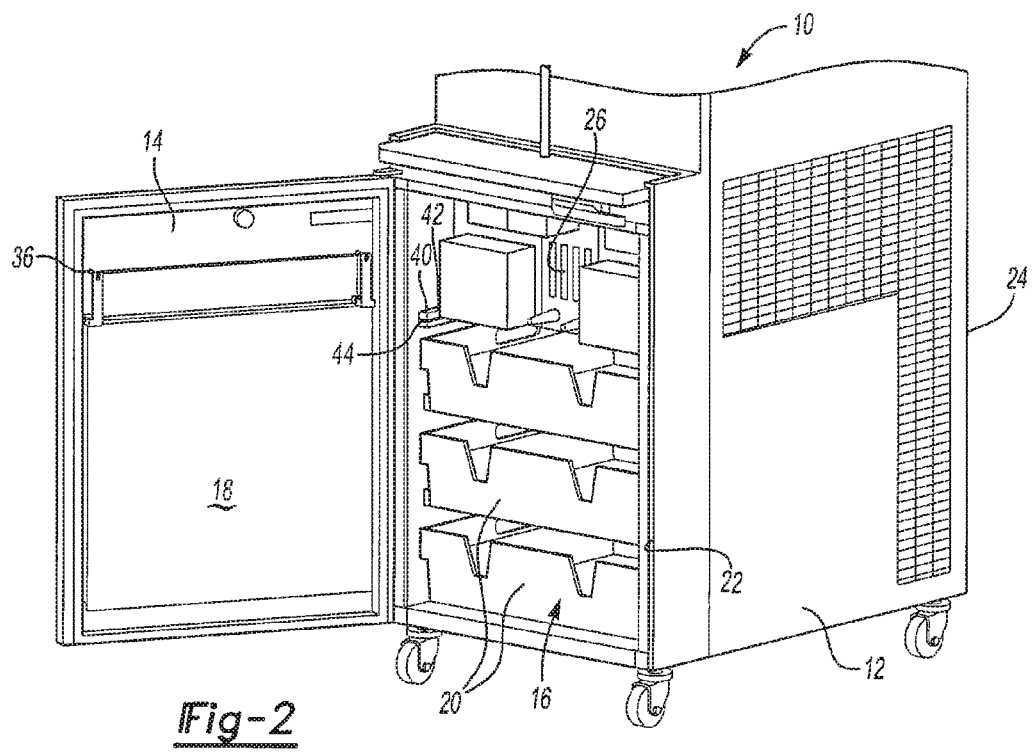
FIG. 2 is a partial perspective view of the inner door system with the inner door in a stored position.
Figure 3:
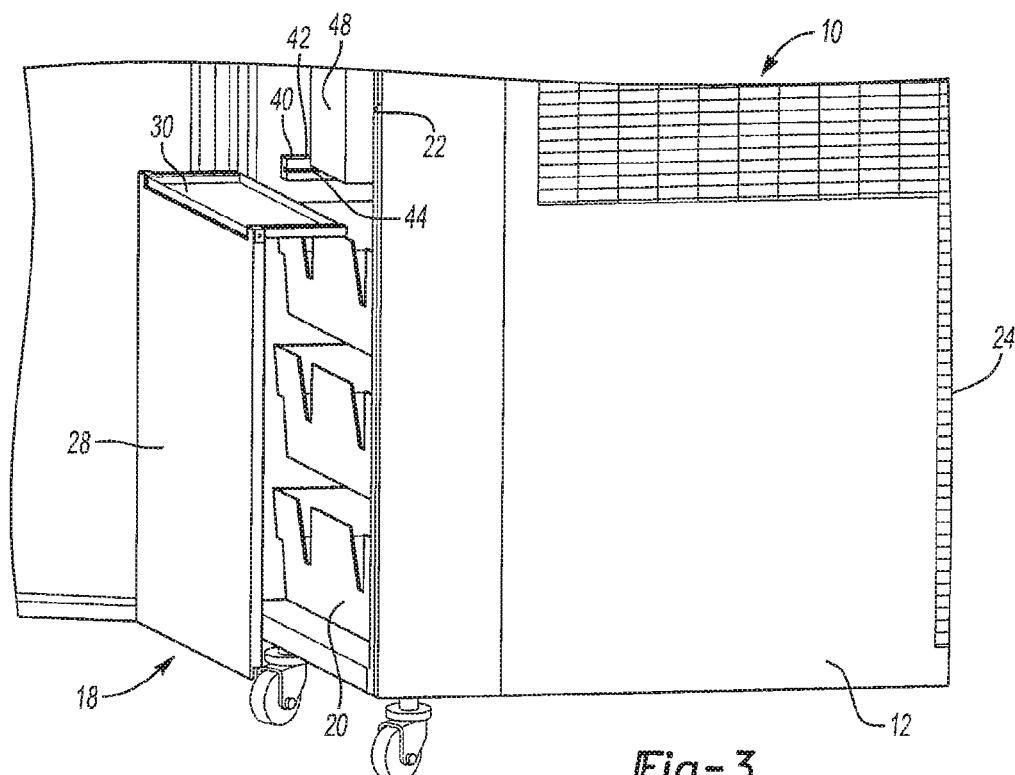
FIG. 3 is a partial perspective view of the inner door system with the inner door being installed into a refrigerator cabinet.
Figure 5:
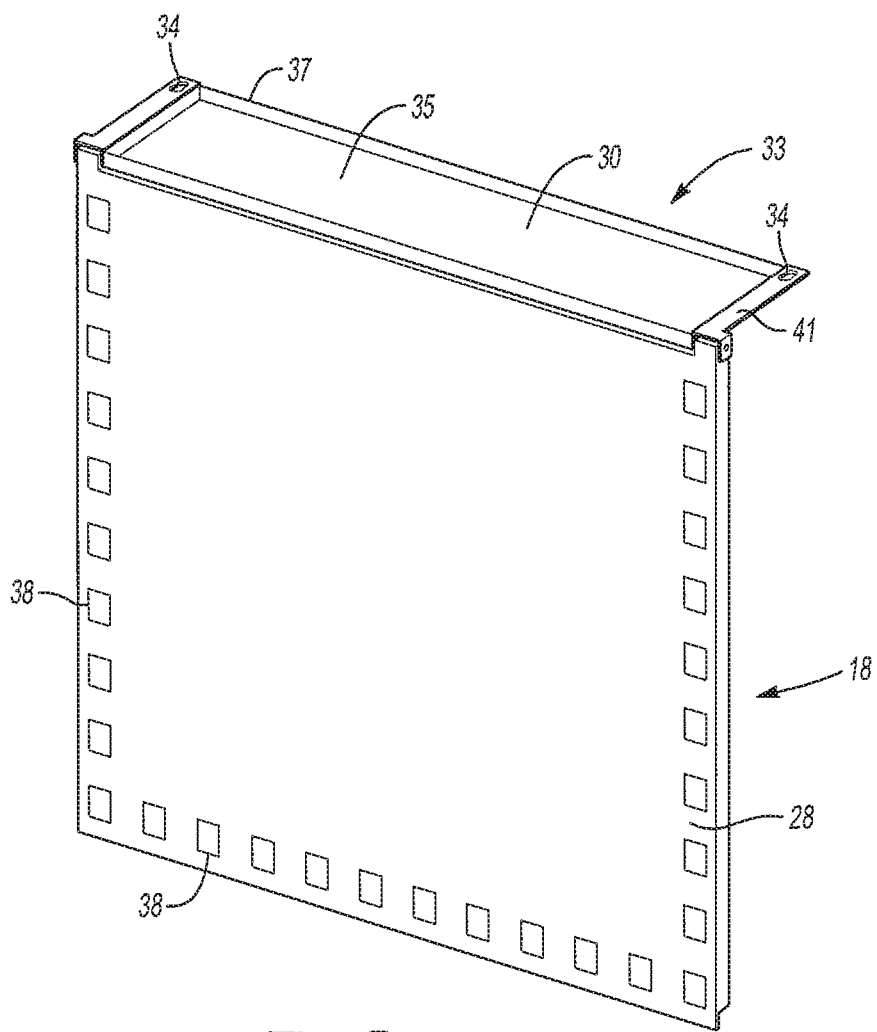
FIG. 5 is a perspective view of the inner door panel.

The top panel or main panel 30, 28 of the inner door panel 18 may include storage slots 34 formed therein that may mate. with storage pins 36 positioned on the door 14 of the refrigerator cabinet 12, as best seen in FIG. 2. The slots and pins 34, 36 with the addition of magnets 38 may be utilized to place the inner door panel 18 in the stored position on the door 14. In one aspect, the inner door panel 18 may be positioned flush with the door 14 as the top panel 30 is hinged with the main panel 28. In the depicted embodiment of FIG. 5, the slots 24 are formed on an edge 41 of the peripheral wall 37.

Soft serve machines may typically include a freezer compartment 16 into which mix is stored. Various regulations require specified temperatures such as below 41° Fahrenheit to be maintained for the soft serve mix at all times. Typically mix is delivered through a refrigerated line to a freezing cylinder. Soft serve machines require cleaning and sanitizing at specified intervals. Typically in such cleaning operations the product pumps 26 must be accessed. and sanitizer fluid loaded into the pumps 26 which is pumped through the mix lines and freezer cylinders and various other components of the machine may be cleaned as well. The operation typically requires having the cabinet door 14 open for approximately 40 minutes. In such a typical situation, the cleaning cycle would require that the product mix in the freezer compartment 16 be relocated to an alternate cooler source to maintain the product's temperature during the cleaning cycle.

The inner door system 10 for the soft serve machine as described herein solves the problems related to the prior art designs. As previously described above, the inner door panel 18 may be located on the door 14 of the freezer when in a stored position using the slots and pins 34, 36 in conjunction with magnets 38 formed on the main panel 28 of the door panel 18. When a cleaning cycle is desired, the inner door panel 18 may be removed from the freezer door 14 and slid into position with respect to the refrigerator cabinet 12.

The refrigerator cabinet 12 may include attachment structures 40 positioned on sides of the cabinet on an inside of the cabinet 12. The attachment structures 40 may include a block 42 having a slot 44 formed therein such that the top panel 30 which is hinged with the main panel 28 may be slid into the slot 44 such that the main panel 28 is flush against the opening of the refrigerator cabinet 12 to define a seal of the freezer compartment. Additionally, the magnets 38 as described above may facilitate attachment to the face of the refrigerator cabinet 12.

Figure 4:
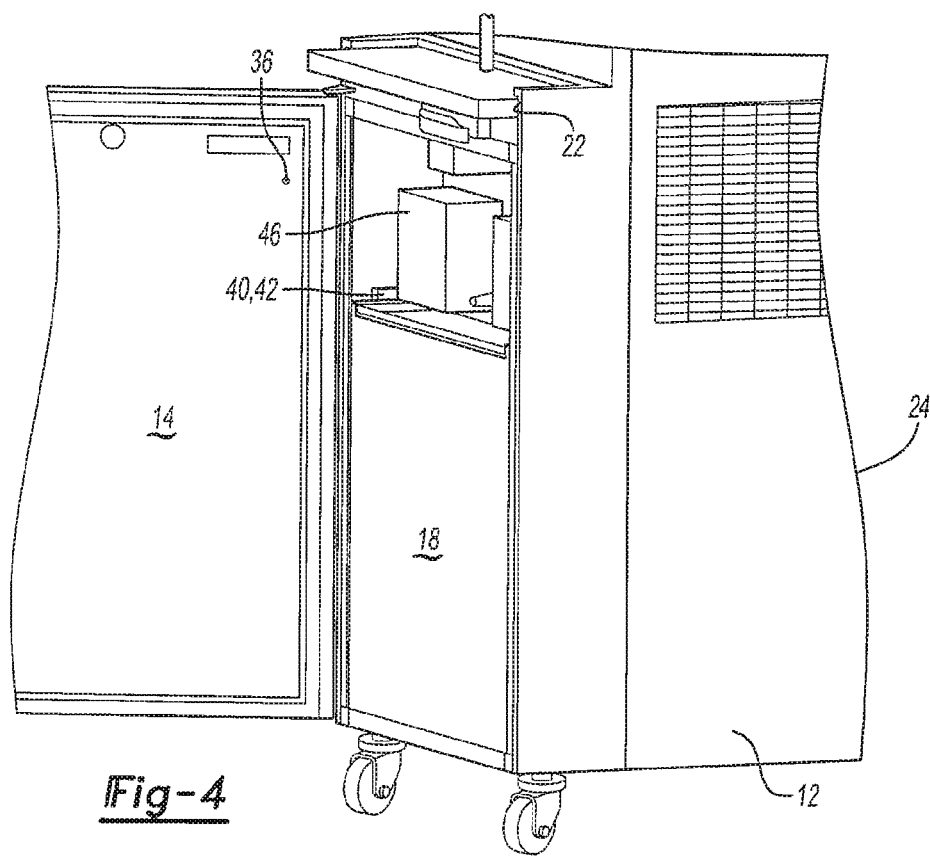
FIG. 4 is a partial perspective view with the inner door in a deployed position.

In the deployed position, as shown in FIGS. 1 and 4, the inner door panel 18 maintains cool air as depicted in FIG. 1 within the refrigerator cabinet 12 even though the door 14 remains open. In this manner, one may access the product pumps 26 which as described above are in a forward position and above the product storage area without drawing in ambient air from outside the cabinet 12 and maintaining the circulated refrigerated air within the cabinet 12.

In one aspect, a position sensor 46 may be utilized to detect when the inner door panel 18 is in the deployed position. The sensor 46 may be connected with a software or control module 48 so that the refrigeration cycle or fan is deactivated when the door 14 is opened unless the inner door panel 18 is in the deployed position as described above. The position sensor 46 reduces the exchange of air during normal operations by deactivating the fan and allows the fan to run during the cleaning cycles when the inner door panel 18 is in a deployed position.

As described above, the inner door system 10 may be utilized with a cleaning cycle such that product mix does not need to be removed from the cabinet 12 during a cleaning cycle. The cleaning cycle may include various steps to meet specified sanitizing and cleaning requirements. In one aspect, the cleaning cycle may include deploying the inner door panel 18 as described above and then draining the product within the system including mix lines, freezer cylinders, and additional portions of the soft serve machine. In one aspect, the step of draining the product may include capping or otherwise closing the product mix containers such as bags and then draining the product within the system into a desired receptacle. Sanitizing fluids may be prepared to include the required composition according to NSF or other local standards. The sanitizing fluid may be utilized to clean the inner portions of the refrigerator cabinet 12 and also be pumped through the system, as will be described in more detail below. After the product has been drained, various portions of the freezer compartment 16 may be disassembled and cleaned according to relevant standards.

Following the cleaning and draining, the sanitizing procedure may be performed. The sanitizing fluid may be coupled with the pumps 26 such that sanitizing fluid is pumped throughout the soft serve machine including the mix lines, dispensing head, and other portions of the soft serve machine. In one aspect, the sanitizing solution should remain in contact with the portions of the soft serve machine a desired time according to specified requirements.

Following the sanitation of the various components, the mix may then be reconnected with the pumps 26 to prime the system. During the priming procedure, mix may be circulated throughout the system and allowed to flow through the dispense head until all sanitizing fluid has been removed from the system. Following the priming, the freezer may be allowed to cycle for a desired time until the product has reached a desired consistency and is ready to serve.

Following the cleaning cycle, the inner door panel 18 may be removed from the slots 44 in the attachment structure 42 and returned to the storage position on the door 14 of the cabinet 12 until another cleaning cycle is performed.

The inner door panel 18 in combination with the forward position of the pumps 26 enables air circulation with the door 14 open and provides access to the product pumps 26 simultaneously. This allows the cleaning cycle to occur while maintaining the mix at a temperature such as below 41° Fahrenheit during a cleaning cycle without removing the mix or product.

The invention claimed is:

1. A soft serve dispensing machine comprising:
a refrigerator cabinet including spaced front and rear portions joined by side walls;
a door hinged to the refrigerator cabinet and moveable between open and closed positions;
a freezer compartment defined in the refrigerator cabinet and receiving a soft serve product mix;
product pumps linked with the soft serve product mix for moving the product to a dispensing portion of the soft serve dispensing apparatus, the product pumps positioned proximate the front portion of the refrigerator cabinet and above the freezer compartment;
attachment structures positioned on the side walls of the refrigerator cabinet;
a removable inner door panel moveable between stored and deployed positions, wherein in the deployed position, the door is in the open position and the inner door panel engages the attachment structures and the inner door panel defines a seal relative to the refrigerator cabinet and cold air within the freezer compartment is maintained in the freezer compartment.

2. The soft serve dispensing machine of claim 1 wherein the product pumps may be accessed when the inner door is positioned in the deployed position.

3. The soft serve dispensing machine of claim 1 wherein the inner door panel includes a main panel hinged to a top panel.

4. The soft serve dispensing machine of claim 3 wherein the top panel includes storage slots formed therein receiving storage pins attached to the door when the inner panel is in the stored position.

5. The soft serve dispensing machine of claim 3 wherein the attachment structure includes a block having a slot formed therein, the top panel of the inner door positioned in the slot and the main panel of the inner door positioned flush against the refrigerator cabinet.

6. The soft serve dispensing machine of claim 3 wherein the top panel includes a tray portion having a base surface joined with an extending peripheral wall.

7. The soft serve dispensing machine of claim 6 wherein the top panel includes storage slots formed on an edge of the peripheral wall receiving storage pins attached to the door when the inner panel is in the stored position.

8. The soft serve dispensing machine of claim 1 further including magnets positioned on the inner door.

9. The soft serve dispensing machine of claim 1 including a position sensor attached to the refrigerator cabinet, the position sensor connected with a control module.

10. A soft serve dispensing machine comprising:
a refrigerator cabinet;
a door hinged to the refrigerator cabinet;
a freezer compartment defined in the refrigerator cabinet and receiving a soft serve product mix;
product pumps linked with the soft serve product mix for moving the product to a dispensing portion of the soft serve dispensing machine, the product pumps positioned proximate the front portion of the refrigerator cabinet and above the freezer compartment;
a removable inner door panel moveable between stored and deployed positions, wherein in the deployed position, the door is in an open position and the inner door panel is attached to the refrigerator cabinet and defines a seal relative to the refrigerator cabinet and cold air within the freezer compartment is maintained in the freezer compartment while the product pumps are accessed.

11. The soft serve dispensing machine of claim 10 wherein the inner door panel includes a main panel hinged to a top panel.

12. The soft serve dispensing machine of claim 11 wherein the top panel includes storage slots formed therein receiving storage pins attached to the door when the inner panel is in the stored position.

13. The soft serve dispensing machine of claim 11 wherein the attachment structure includes a block having a slot formed therein, the top panel of the inner door positioned in the slot and the main panel of the inner door positioned flush against the refrigerator cabinet.

14. The soft serve dispensing machine of claim 11 wherein the op panel includes a tray portion having a base surface joined with an extending peripheral wall.

15. The soft serve dispensing machine of claim 14 wherein the top panel includes storage slots formed on an edge of the peripheral wall receiving storage pins attached to the door when the inner panel is in the stored position.

16. The soft serve dispensing machine of claim 10 including a position sensor attached to the refrigerator cabinet, the position sensor connected with a control module.

17. A method of cleaning a soft serve machine comprising the steps of:
providing a refrigeration cabinet having a door hinged thereon, the refrigeration cabinet including a freezer compartment having product mix stored therein;
opening the door;
removing an inner door panel attached to the door and positioning the inner door panel in an attachment structure attached to the refrigeration cabinet defining a seal;
accessing product pumps;
performing a cleaning cycle when the product mix is maintained in the freezer compartment.

18. The method of claim 17 including the step of removing the inner door panel from the attachment structure following the cleaning cycle and reattaching to the door in a stored position.

19. The method of claim 17 including the step of circulating cold air in the freezer compartment while performing the cleaning cycle and wherein the cold air is maintained in the freezer compartment.

20. The method of claim 17 including the step of providing a position sensor attached to the refrigerator cabinet, the position sensor connected with a control module wherein the control module deactivates a fan in the freezer compartment upon opening of the door until the inner panel is positioned in the attachment structure.

* * * * *